(12) United States Patent
Stuckey et al.

(10) Patent No.: US 12,116,089 B1
(45) Date of Patent: Oct. 15, 2024

(54) CLAMPING STORAGE DEVICE

(71) Applicant: Protomet Corporation, Oak Ridge, TN (US)

(72) Inventors: Alec Stuckey, Oak Ridge, TN (US);
Brian Pitcher, Oak Ridge, TN (US);
Lynn Haynes, Oak Ridge, TN (US);
Aaron Pierce, Knoxville, TN (US);
Stewart Boyd, Knoxville, TN (US);
William Matthew Reid, Knoxville, TN (US); Jeff Bohanan, Powell, TN (US)

(73) Assignee: Protomet Corporation, Oak Ridge, TN (US)

( * ) Notice: Subject to any disclaimer, the term of this patent is extended or adjusted under 35 U.S.C. 154(b) by 0 days.

(21) Appl. No.: 18/669,713

(22) Filed: May 21, 2024

Related U.S. Application Data

(60) Provisional application No. 63/573,196, filed on Apr. 2, 2024, provisional application No. 63/610,064, filed on Dec. 14, 2023.

(51) Int. Cl.
*B63B 32/83* (2020.01)
*B60R 9/048* (2006.01)

(52) U.S. Cl.
CPC .............. *B63B 32/83* (2020.02); *B60R 9/048* (2013.01)

(58) Field of Classification Search
CPC ......... B63B 32/80; B63B 32/83; B63B 32/87; B60R 9/048; B60R 9/08; B60R 9/12
See application file for complete search history.

(56) References Cited

U.S. PATENT DOCUMENTS

| | | | | |
|---|---|---|---|---|
| 5,203,484 | A | * | 4/1993 | Englander ................. B60R 9/10 224/570 |
| 2018/0022284 | A1 | * | 1/2018 | Bessette .................... B60R 9/08 224/315 |
| 2021/0046881 | A1 | * | 2/2021 | Vidar ....................... B60R 9/058 |
| 2021/0261222 | A1 | * | 8/2021 | Hellweg ................. B63B 32/83 |
| 2022/0371699 | A1 | * | 11/2022 | Lake ........................ B63B 32/83 |
| 2023/0045830 | A1 | * | 2/2023 | Wilson .................... B63B 32/83 |

OTHER PUBLICATIONS

High Performance Hydrofoil Sky Ski Comptech Marine, Fixed Hydrofoil Rack, at https://www.skyski.com/product-p/64-0110.htm (2 pages).

* cited by examiner

*Primary Examiner* — Andrew Polay
(74) *Attorney, Agent, or Firm* — Robinson IP Law, PLLC

(57) ABSTRACT

Various implementations include a clamping storage device. The device includes a clamping assembly having a proximal stop, a gas spring, and a distal stop. The proximal stop extends along a proximal stop longitudinal axis. The gas spring has a gas spring longitudinal axis, first end, and a second end. The first end of the gas spring is coupled to the proximal stop. The distal stop is coupled to the second end of the gas spring and extends along a distal stop longitudinal axis. The proximal stop longitudinal axis and the distal stop longitudinal axis are both locatable in an assembly plane that incudes the gas spring longitudinal axis. The gas spring is biased toward an extended position and urgable toward a retracted state. The gas spring is movable toward the extended position in an unlocked state and is prevented from being moved toward the extended position in a locked state.

23 Claims, 5 Drawing Sheets

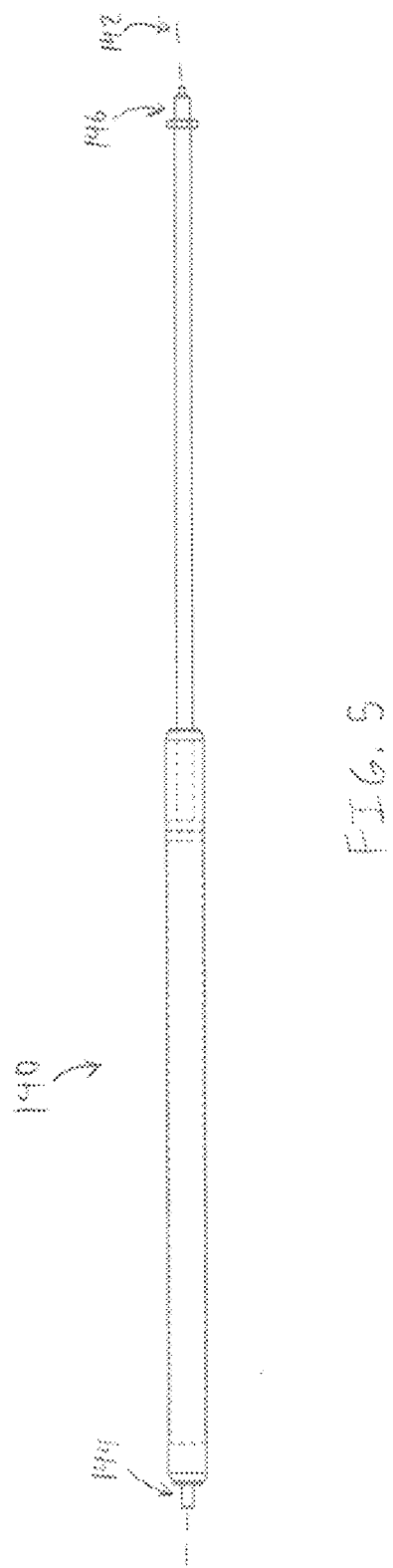

CLAMPING STORAGE DEVICE

BACKGROUND

Board-type sporting goods, such as surf boards and wakeboards, may be used in a variety of activities. For example, wakesurfing and wakeboarding have become popular watersports that may be performed behind a boat or other vessel. When not in use, it may be necessary to securely store sports boards such that the sports boards do not occupy significant space within a boat. For example, it may be desirable to store sports boards away from a floor of the boat to prevent the sports boards from occupying significant space on the boat and to prevent the sports boards from being stepped on or otherwise damaged when not in use.

Sports boards, such as wakeboards and wakesurf boards, may be difficult to transport when not in use. For example, sports boards may vary significantly in size. Wakesurf boards may vary significantly in thickness, with a thickness of a particular wakesurf board varying depending on the style of wakesurf board and stability of the wakesurf board. Further, thickness of a wakesurf board may vary significantly relative to other sports boards such as wakeboards.

Other difficulties may relate to securely holding the sports board during transportation. For example, sports boards may be stored on or around a tower of a boat when not in use. When one or more sports boards are stored on a vehicle such as a boat, it is important that the one or more sports boards are held securely in place to prevent the one or more sports boards from becoming dislodged during movement of the vehicle.

Current devices for securing sports boards and other equipment can be expensive due to the complexity and robustness needed to hold such large objects. Thus, there is a need for a simpler and more cost effective device for securing sports boards and other equipment to a vehicle such as a boat or other vessel.

SUMMARY

Various implementations include a clamping storage device. The device includes a clamping assembly. The clamping assembly includes a proximal stop, a gas spring, and a distal stop. The proximal stop extends along a proximal stop longitudinal axis. The gas spring has a gas spring longitudinal axis, first end, and a second end opposite and spaced apart from the first end along the gas spring longitudinal axis. The first end of the gas spring is coupled to the proximal stop. The distal stop is coupled to the second end of the gas spring. The distal stop extends along a distal stop longitudinal axis. The proximal stop longitudinal axis and the distal stop longitudinal axis are both locatable in an assembly plane that incudes the gas spring longitudinal axis. The gas spring is movable parallel to the gas spring longitudinal axis between a retracted position and an extended position. The distal stop is further from the proximal stop in the extended position than it is in the retracted position. The gas spring is biased toward the extended position and urgable toward the retracted state. The gas spring is movable between a locked state and an unlocked state. The gas spring is movable toward the extended position in the unlocked state and is prevented from being moved toward the extended position in the locked state.

In some implementations, the device further includes a housing. In some implementations, the housing includes the proximal stop. In some implementations, the housing defines a cavity. in some implementations, the first end of the gas spring is disposed within the cavity.

In some implementations, the device further includes a handle for moving the gas spring between the extended position and the retracted position.

In some implementations, the clamping assembly is a first clamping assembly. In some implementations, the device further includes a second clamping assembly. In some implementations, a plane including the gas spring longitudinal axis of the first clamping assembly and the gas spring longitudinal axis of the second clamping assembly is perpendicular to the assembly plane of the first clamping assembly and the assembly plane of the second clamping assembly.

In some implementations, the clamping assembly is a first clamping assembly. In some implementations, the device further includes a second clamping assembly. In some implementations, the assembly plane of the first clamping assembly is the same as the assembly plane of the second clamping assembly.

In some implementations, the device further includes a housing, and the housing includes the proximal stop of the first clamping assembly and the proximal stop of the second clamping assembly. In some implementations, the housing defines a cavity, and the first end of the gas spring of the first clamping assembly and the first end of the gas spring of the second clamping assembly are disposed within the cavity.

In some implementations, the gas spring longitudinal axis of the first clamping assembly and the gas spring longitudinal axis of the second clamping assembly form an oblique angle. In some implementations, the first end of the gas springs are closer to each other than the second ends of the gas springs.

In some implementations, the device further includes a third clamping assembly and a fourth clamping assembly. In some implementations, the assembly plane of the third clamping assembly is the same as the assembly plane of the fourth clamping assembly.

In some implementations, the gas spring longitudinal axis of the third clamping assembly and the gas spring longitudinal axis of the fourth clamping assembly form an oblique angle. In some implementations, the first end of the gas springs are closer to each other than the second ends of the gas springs.

In some implementations, a plane including the gas spring longitudinal axis of the first clamping assembly and the gas spring longitudinal axis of the third clamping assembly is perpendicular to the assembly plane of the first clamping assembly and the assembly plane of the third clamping assembly. In some implementations, a plane including the gas spring longitudinal axis of the second clamping assembly and the gas spring longitudinal axis of the fourth clamping assembly is perpendicular to the assembly plane of the second clamping assembly and the assembly plane of the fourth clamping assembly.

In some implementations, the device further includes a locking trigger for moving the gas spring from the locked state to the unlocked state. In some implementations, the locking trigger is disposed at a position that is at an opposite side of the proximal stop from the distal stop.

In some implementations, the proximal stop longitudinal axis and the gas spring longitudinal axis form an oblique angle such that the distal stop is closer to a distal end of the proximal stop than it is to a proximal end of the proximal stop. In some implementations, the distal stop longitudinal axis and the gas spring longitudinal axis form an oblique angle such that the proximal stop is closer to a distal end of the distal stop than it is to a proximal end of the distal stop.

In some implementations, the distal end of the distal stop is resiliently movable away from the proximal stop by a biasing force of the gas spring.

In some implementations, the device further includes a mounting portion for mounting the device to a vehicle. In some implementations, the mounting portion is adjacent the proximal stop.

In some implementations, the device further includes a mast clamp configured to releasably secure a mast of a sports board being secured by the proximal stop and the distal stop. In some implementations, the mast clamp includes a proximal mast stop and a distal mast stop. In some implementations, the distal mast stop is movable relative to the proximal mast stop parallel to a mast longitudinal axis between a retracted position and an extended position. In some implementations, the distal mast stop is further from the proximal mast stop in the extended position than it is in the retracted position.

In some implementations, the mast longitudinal axis is disposed perpendicular to the gas spring longitudinal axis.

In some implementations, the mast clamp further includes a mast gas spring having a first end and a second end opposite and spaced apart from the first end of the mast gas spring along the mast longitudinal axis. In some implementations, the first end of the mast gas spring is coupled to the proximal mast stop. In some implementations, the mast gas spring is movable parallel to the mast longitudinal axis to move the distal mast stop between the retracted position and the extended position.

In some implementations, the mast gas spring is movable between a locked state and an unlocked state. In some implementations, the mast gas spring is movable toward the extended position in the unlocked state and is prevented from being moved toward the extended position in the locked state.

BRIEF DESCRIPTION OF DRAWINGS

Example features and implementations of the present disclosure are disclosed in the accompanying drawings. However, the present disclosure is not limited to the precise arrangements and instrumentalities shown. Similar elements in different implementations are designated using the same reference numerals.

FIG. 5 is a side view of a gas spring of a clamping assembly of the clamping storage device of FIG. 1.

FIG. 6 is a perspective view of a clamping storage device, according to another implementation.

DETAILED DESCRIPTION

Figure 1:
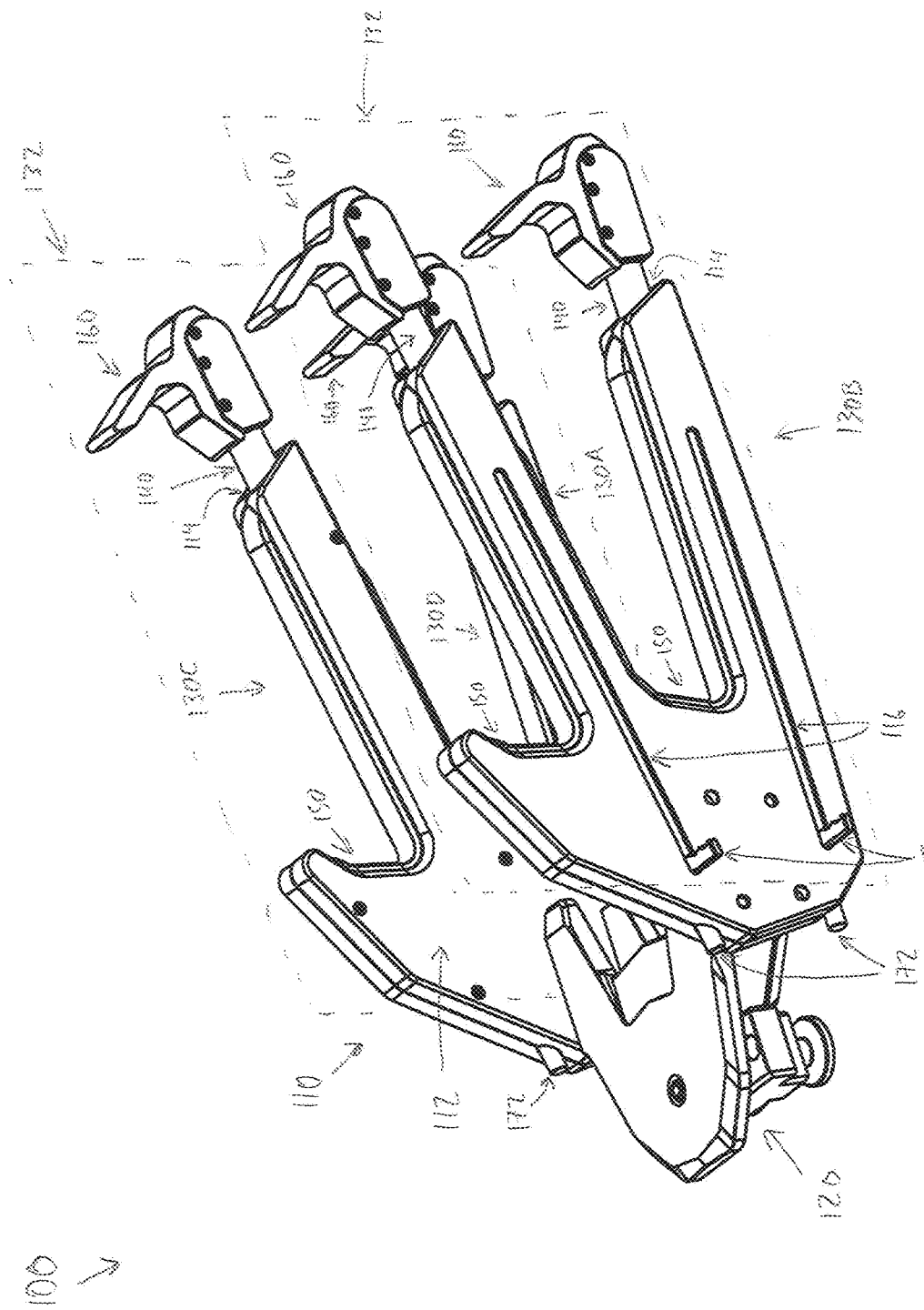
FIG. 1 is a perspective view of a clamping storage device in the retracted position, according to one implementation.

The devices, systems, and methods disclosed herein provide for a clamping storage device. The device includes four clamping assemblies that each include a locking-type gas spring. The gas springs are biased toward their extended position and urgable toward their retracted position. The gas springs each include a locking system that must be actuated to the unlocked position for the gas spring to move toward the extended position and release the clamped piece of equipment.

The clamping assemblies are oriented such that two of the clamping assemblies are able to clamp a single piece of equipment and the other two clamping assemblies are able to clamp another single piece of equipment below the first two clamping assemblies.

Various implementations include a clamping storage device. The device includes a clamping assembly. The clamping assembly includes a proximal stop, a gas spring, and a distal stop. The proximal stop extends along a proximal stop longitudinal axis. The gas spring has a gas spring longitudinal axis, first end, and a second end opposite and spaced apart from the first end along the gas spring longitudinal axis. The first end of the gas spring is coupled to the proximal stop. The distal stop is coupled to the second end of the gas spring. The distal stop extends along a distal stop longitudinal axis. The proximal stop longitudinal axis and the distal stop longitudinal axis are both locatable in an assembly plane that incudes the gas spring longitudinal axis. The gas spring is movable parallel to the gas spring longitudinal axis between a retracted position and an extended position. The distal stop is further from the proximal stop in the extended position than it is in the retracted position. The gas spring is biased toward the extended position and urgable toward the retracted state. The gas spring is movable between a locked state and an unlocked state. The gas spring is movable toward the extended position in the unlocked state and is prevented from being moved toward the extended position in the locked state.

FIGS. 1-5 show a clamping storage device 100 according to one implementation. The device 100 includes a housing 110, a first clamping assembly 130A, a second clamping assembly 130B, a third clamping assembly 130C, a fourth clamping assembly 130D (together, the clamping assemblies 130), and a mounting portion 120.

The housing 110 defines a cavity 112 and four openings 114 extending from an outer surface of the housing 110 to the cavity 112. The mounting portion 120 is coupled to the housing 110 for mounting the device 100 to a vehicle such as a boat.

Each clamping assembly 130 includes a gas spring 140, a proximal stop 150, and a distal stop 160.

The gas spring 140, shown in detail in FIG. 5, is a locking-type gas spring. The gas spring 140 has a gas spring longitudinal axis 142, first end 144, and a second end 146 opposite and spaced apart from the first end 144 along the gas spring longitudinal axis 142. The first end 144 of the gas spring 140 of each of the clamping assemblies 130 are disposed within the cavity 112 of the housing 110, and the gas spring 140 extends out of a different one of the four openings 114 of the housing 110.

Figure 2:
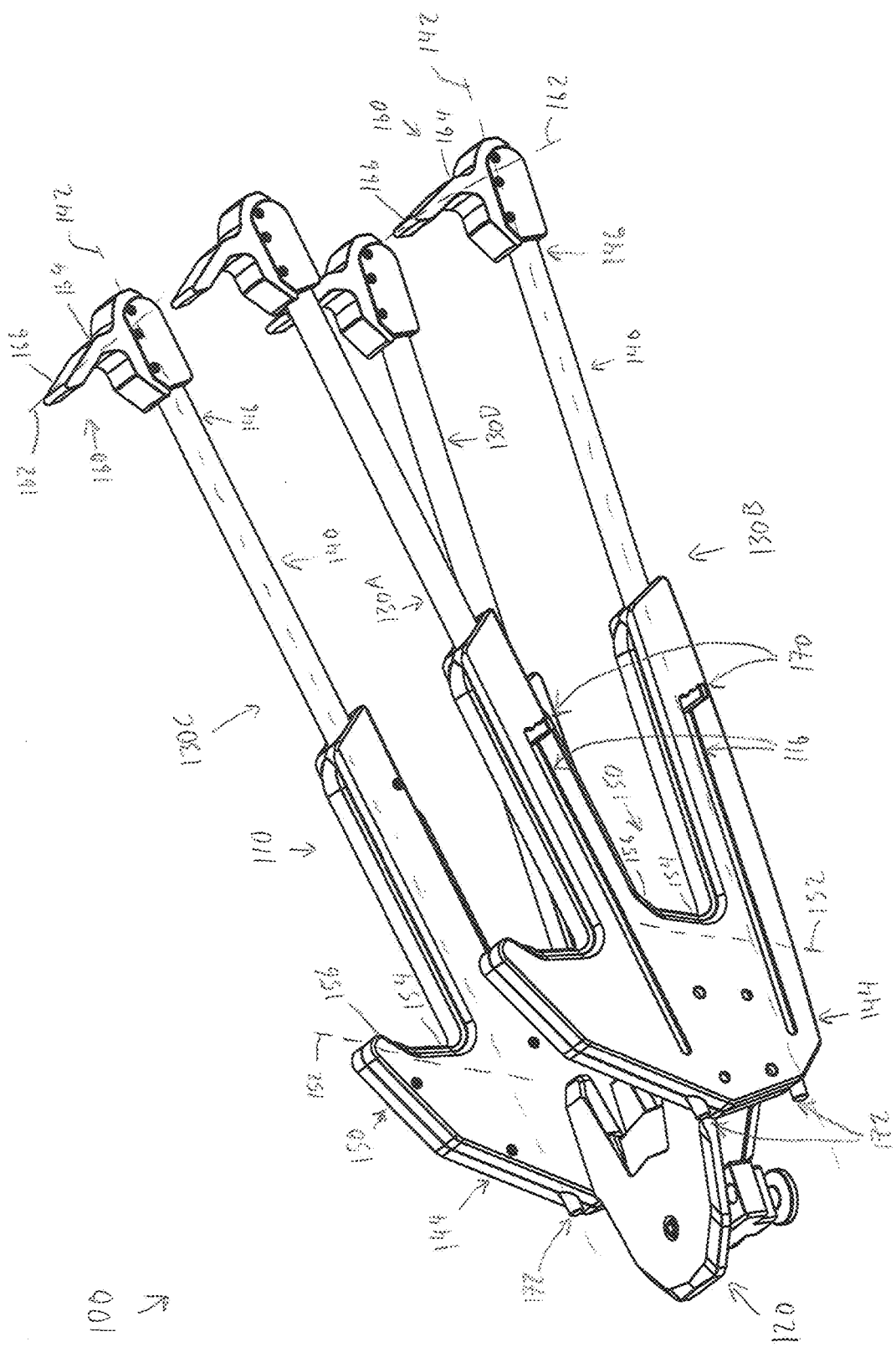
FIG. 2 is a perspective view of the clamping storage device of FIG. 1 in the extended position.

As shown in FIGS. 1 and 2, the proximal stop 150 is defined by the housing 110 adjacent to the first end 144 of the gas spring 140 and adjacent the mounting portion 120. The proximal stop 150 includes a cushioned surface. The proximal stop 150 extends along a proximal stop longitudinal axis 152 from a proximal end 154 that is proximal to the gas spring longitudinal axis 142 and a distal end 156 opposite and spaced apart from the proximal end 154 of the proximal stop 150. The housing 110 further includes a bottom cushioned surface for the piece of equipment to rest on when being clamped by the device 100.

The distal stop 160 is coupled to the second end 146 of the gas spring 140 and also includes a cushioned surface. The distal stop 160 extends along a distal stop longitudinal axis 162 from a proximal end 164 that is proximal to the gas spring longitudinal axis 142 and a distal end 166 opposite and spaced apart from the proximal end 164 of the distal stop 160.

The gas spring 140 is movable parallel to the gas spring longitudinal axis 142 between a retracted position and an extended position. The distal stop 160 is further from the proximal stop 150 in the extended position than it is in the retracted position. The gas spring 140 is biased toward the extended position and urgable toward the retracted state.

The housing 110 defines a handle slot 116 extending parallel to the gas spring longitudinal axis 142. A handle 170 extends through the handle slot 116 and is coupled to a portion of the gas spring 140. The handle 170 can be moved along through the handle slot 116 in a direction parallel to the gas spring longitudinal axis 142 to move the gas spring 140 between the extended position and the retracted position.

The proximal stop longitudinal axis 152 and the distal stop longitudinal axis 162 are both locatable in an assembly plane 132 that incudes the gas spring longitudinal axis 142. A piece of equipment can be placed on the clamping assembly 130 when the gas spring 140 is in the extended position. The gas spring 140 can then be caused to move toward the retracted position such that the distal stop 160 and the proximal stop 150 both contact and exert a biasing force on the piece of equipment to hold the piece of equipment in a static position relative to the clamping assembly 130.

As noted above, the gas spring 140 is a locking-type gas spring and is movable between a locked state and an unlocked state. The gas spring 140 is movable toward the extended position in the unlocked state and is prevented from being moved toward the extended position in the locked state. Thus, when the distal stop 160 and proximal stop 150 both contact the piece of equipment and exert the biasing force on the piece of equipment, the locking mechanism prevents the gas spring 140 from moving toward the extended position to release the piece of equipment.

The device 100 further includes a locking trigger 172 for each of the four clamping assemblies 130. The locking trigger 172 is shown in detail in FIG. 4. The locking trigger 172 is configured to move the gas spring 140 from the locked state to the unlocked state. A user can activate the locking trigger 172 to place the gas spring 140 in the unlocked state so that the gas spring 140 can be urged toward the extended position to release a previously clamped piece of equipment. The locking trigger 172 of each of the four clamping assemblies 130 are disposed at a position adjacent the mounting portion 120 so that the locking trigger 172 is easily accessible by a user near the point where the device 100 is mounted to the vehicle. Thus, the locking trigger 172 is located in a location that on the opposite side of the proximal stop 150 from the distal stop 160.

As shown in FIGS. 1 and 2, the first clamping assembly 130A and the third clamping assembly 130C are located beside each other such that a piece of equipment can be disposed across and clamped by both the first clamping assembly 130A and the third clamping assembly 130C. Thus, a plane including the gas spring longitudinal axis 142 of the first clamping assembly 130A and the gas spring longitudinal axis 142 of the third clamping assembly 130C is perpendicular to the assembly plane 132 of the first clamping assembly 130A and the assembly plane 132 of the third clamping assembly 130C.

Similarly, the second clamping assembly 130B and the fourth clamping assembly 130D are located beside each other such that a piece of equipment can be disposed across and clamped by both the second clamping assembly 130B and the fourth clamping assembly 130D. Thus, a plane including the gas spring longitudinal axis 142 of the second clamping assembly 130B and the gas spring longitudinal axis 142 of the fourth clamping assembly 130D is perpendicular to the assembly plane 132 of the second clamping assembly 130B and the assembly plane 132 of the fourth clamping assembly 130D.

The housing 110 is configured such that the first clamping assembly 130A and the third clamping assembly 130C are both located above the second clamping assembly 130B and the fourth clamping assembly 130D. Also, the first clamping assembly 130A is located above the second clamping assembly 130B, and the third clamping assembly 130C is located above the fourth clamping assembly 130D. Thus, the assembly plane 132 of the first clamping assembly 130A is the same as the assembly plane 132 of the second clamping assembly 130B, and the assembly plane 132 of the third clamping assembly 130C is the same as the assembly plane 132 of the fourth clamping assembly 130D.

The plane including the gas spring longitudinal axis 142 of the first clamping assembly 130A and the gas spring longitudinal axis 142 of the third clamping assembly 130C forms an oblique angle with the plane including the gas spring longitudinal axis 142 of the second clamping assembly 130B and the gas spring longitudinal axis 142 of the fourth clamping assembly 130D. The oblique angle is such that the first end 144 of the gas springs 140 of the first clamping assembly 130A, the second clamping assembly 130B, the third clamping assembly 130C, and the fourth clamping assembly 130D are closer to each other than the second ends 146 of the gas springs 140 are to each other. This "opened" configuration allows for a piece of equipment to be placed on the second clamping assembly 130B and the fourth clamping assembly 130D without the first clamping assembly 130A and third clamping assembly 130C, which are located above the second clamping assembly 130B and the fourth clamping assembly 130D, interfering.

The proximal stop 150 is angled toward the distal stop 160 such that the proximal stop longitudinal axis 152 and the gas spring longitudinal axis 142 form an oblique angle. Thus, the distal stop 160 is closer to the distal end 156 of the proximal stop 150 than it is to the proximal end 154 of the proximal stop 150.

Similarly, the distal stop 160 is angled toward the proximal stop 150 such that the distal stop longitudinal axis 162 and the gas spring longitudinal axis 142 form an oblique angle. Thus, the proximal stop 150 is closer to a distal end 166 of the distal stop 160 than it is to a proximal end 164 of the distal stop 160.

The angles of the proximal stop 150 and the distal stop 160 of each clamping assembly 130 cause the equipment being clamped between the proximal stop 150 and the distal stop 160 to be pushed toward the gas spring longitudinal axis 142 when in the retracted position.

Furthermore, the distal stop 160 can be made of a resilient material such that the distal end 166 of the distal stop 160 can be deflected away from the proximal stop 150. In some cases, the locking mechanism of the gas spring 140 can have backlash such that, once the second end 146 of the gas spring 140 is moved toward the retracted position to the desired location and is released, the biasing force of the gas spring 140 may cause the second end 146 of the gas spring 140 to move slightly back toward the extended position. This could cause the piece of equipment being clamped to become loose. However, because the distal stop 160 is able to resiliently flex, the distal stop 160 can still remain firmly contact with the piece of equipment even after the slight movement of the backlash of the gas spring 140.

Figure 3:
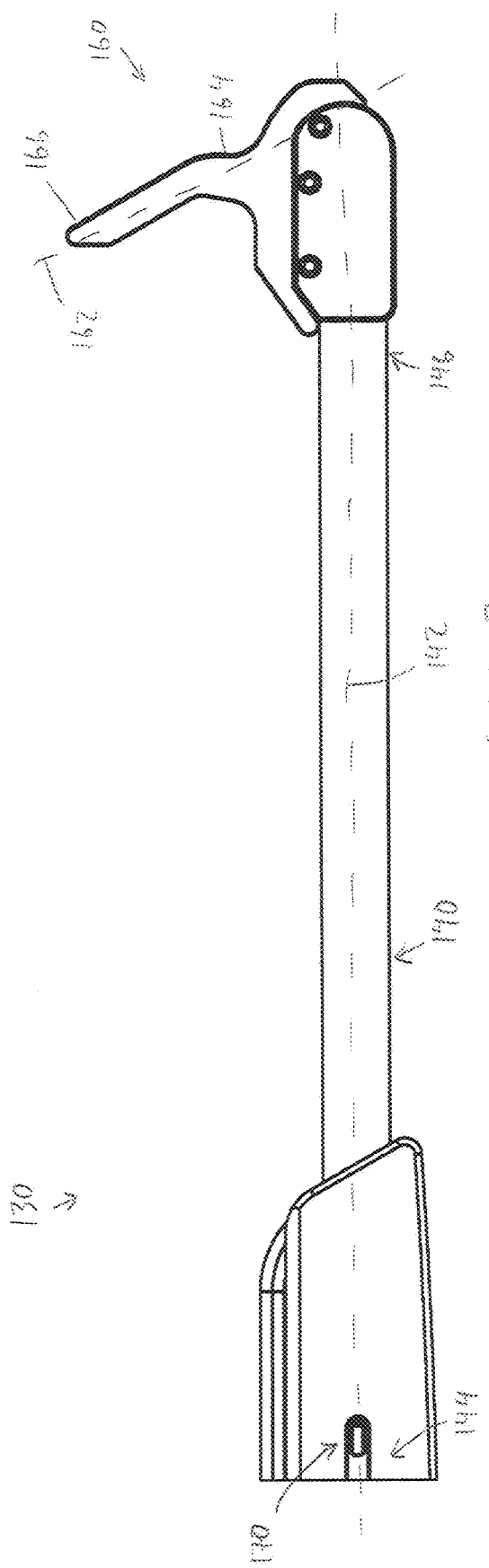
FIG. 3 is a side view of the clamping storage device of FIG. 1.
Figure 4:
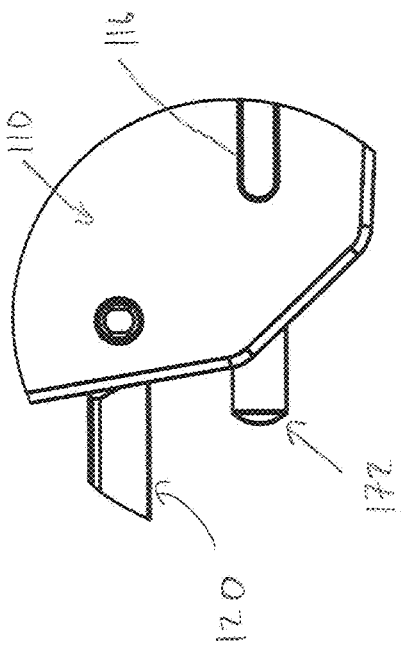
FIG. 4 is a side view of the clamping storage device of FIG. 1.
Figure 9:
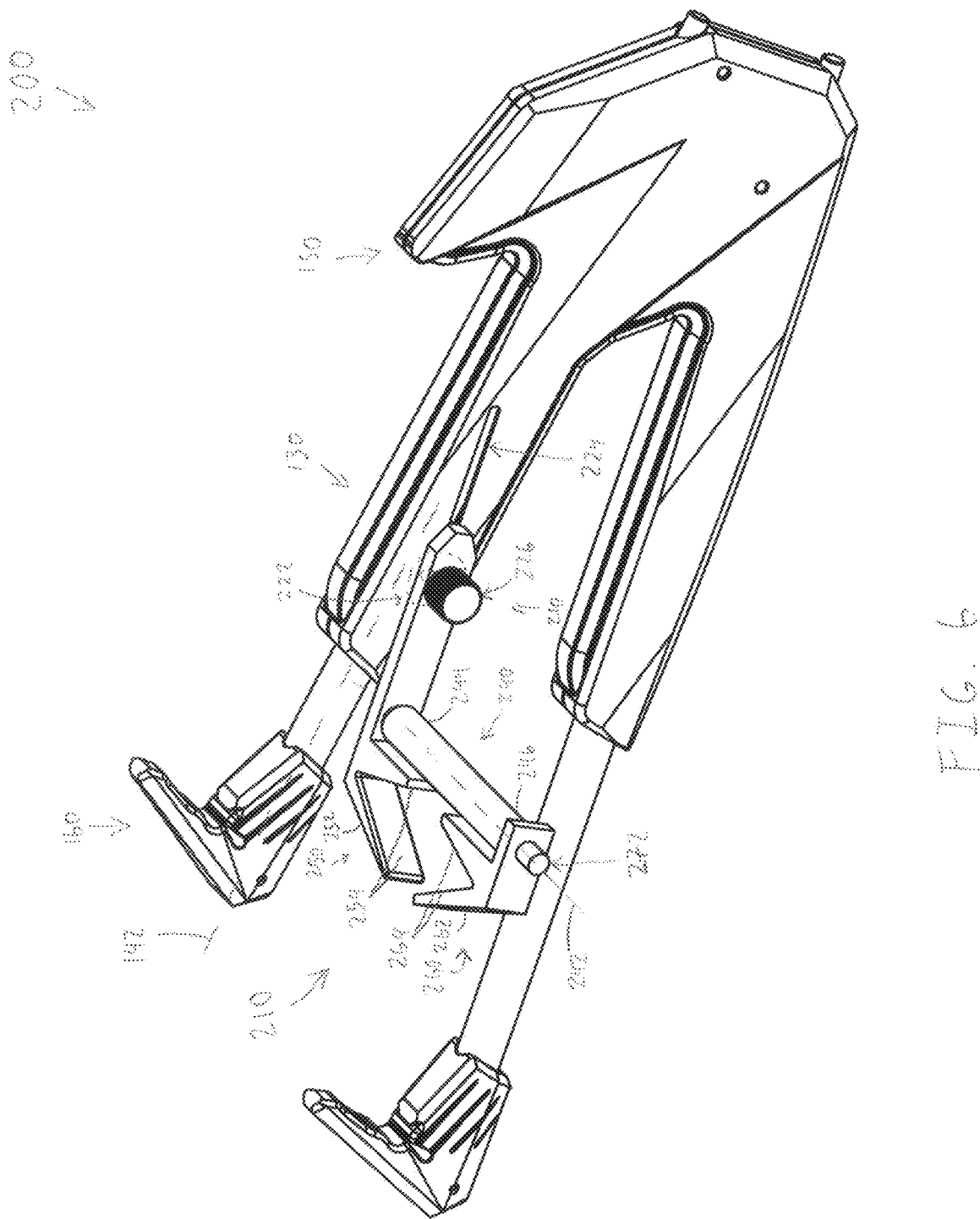

In use, the locking trigger 172 of each of the clamping assemblies 130 is actuated to cause the biasing force of the gas springs 140 to cause the gas springs 140 to move from the retracted position (shown in FIG. 1) to the extended position (shown in FIGS. 2 and 3). A piece of equipment is disposed on the first clamping assembly 130A and the third clamping assembly 130C or on the second clamping assembly 130B and the fourth clamping assembly 130D. The piece of equipment is disposed between the distal stop 160 and the proximal stop 150 of the respective clamping assemblies 130.

The user then moves the handles 170 of the clamping assemblies 130 along the handle slots 116 to move the second end 146 of the gas spring 140 each clamping assembly 130 from the extended position toward the retracted position. Once the distal stops 160 and proximal stops 150 of the clamping assemblies 130 contact the piece of equipment, the distal end 166 of the distal stop 160 is resiliently deflected by the force being exerted on the handles 170. When the handle 170 is released, the respective gas spring 140 locks in place. Any backlash of the gas spring lock is absorbed by the resiliency of the distal stop 160 such that the piece of equipment is firmly retained by the clamping assemblies 130.

The locking triggers 172 can be actuated to cause the gas springs 140 to unlock and move back toward the extended position to release the previously clamped piece of equipment.

In some implementations, the device can include one or more additional clamping assemblies for securing other items or additional portions of a sports board, such as the mast of a wake foil. In such implementations, the additional clamping assemblies would be oriented perpendicular to the assembly planes such that the clamping assembly is capable of clamping a vertical mast. Each additional clamping assembly can include all or some of the same features as described herein for any other clamping assembly. However, each additional clamping assembly can be modified to be a relatively shorter length between the proximal stop and the distal stop than the board clamping assemblies described herein in order to secure the relatively smaller mast of the wake foil. In some implementations, the additional clamping assembly does not include any of the same features as the clamping assemblies described herein and may include any other means known for coupling a mast of a wake foil or other item.

For example, FIG. 6 shows a clamping storage device 200, according to another implementation. The clamping storage device 200 shown in FIG. 6 includes several features that are similar to the features of the clamping storage device 100 shown in FIGS. 1-5. Thus, reference numbers similar to those used for features of the clamping storage device 100 shown in FIGS. 1-5 are used for features of the clamping storage device 200 shown in FIG. 6.

While the device 200 shown in FIG. 6 is similar to the device 100 shown in FIGS. 1-5, the clamping storage device 200 shown in FIG. 6 further includes a mast clamp 210. The mast clamp 210 is configured to releasably secure a mast of a sports board, such as the mast of a wake foil, that is being secured by the main proximal stops 150 and distal stops 160. The mast clamp 210 includes a proximal mast stop 250, a distal mast stop 260, a mast gas spring 240, and a mast clamp mounting portion 220.

The proximal mast stop 250 shown in FIG. 6 is integrally formed with the mast clamp mounting portion 220, but in some implementations, the proximal mast stop and the mounting portion can be separate components. The proximal mast stop 250 includes a V-shaped portion 252 to provide two contact surfaces 254 that are oblique relative to each other. The contact surfaces 254 are configured to abut the mast of the sports board in use. At least the contact surfaces 254 of the proximal mast stop 250 can be made of a resilient material such that the distal ends of the V-shaped portion 252 can be deflected away from each other when force is applied to the contact surfaces 254.

The distal mast stop 260 also includes a V-shaped portion 262 to provide two contact surfaces 264 that are oblique relative to each other. The contact surfaces 264 are configured to abut the mast of the sports board in use. At least the contact surfaces 264 of the distal mast stop 260 can be made of a resilient material such that the distal ends of the V-shaped portion 262 can be deflected away from each other when force is applied to the contact surfaces 264.

The mast gas spring 240 has a first end 244 and a second end 246 opposite and spaced apart from the first end 244 of the mast gas spring 240 along a mast longitudinal axis 242. The mast longitudinal axis 242 is disposed perpendicular to the gas spring longitudinal axis 142 such that the mast of a sports board clamped in the clamping assembly 130 extends between the proximal mast stop 250 and the distal mast stop 260. In some implementations, mast longitudinal axis 242 is also disposed parallel to the plane including the gas spring longitudinal axis 142 of the first clamping assembly 130A and the gas spring longitudinal axis 142 of the third clamping assembly 130C. in some implementations, the mast longitudinal axis 242 is disposed parallel to the gas spring longitudinal axis 142 or at any oblique angle to the gas spring longitudinal axis 142.

The first end 244 of the mast gas spring 240 is coupled to the proximal mast stop 250, and the second end 246 of the mast gas spring 240 is coupled to the distal mast stop 260. The mast gas spring 240 of the mast clamp 210 shown in FIG. 6 is disposed within a tube to protect the mast gas spring 240 from external forces.

The mast gas spring 240 is biased toward an extended position and is urgable toward a retracted position. The mast gas spring 240 is configured to move the distal mast stop 260 between the extended position and the retracted position in a direction parallel to the mast longitudinal axis 242. The distal mast stop 260 is further from the proximal mast stop 250 in the extended position than it is in the retracted position.

The mast gas spring 240 includes an integrated lock, but in some implementations, the device includes a separate locking mechanism, such as those known in the art. The mast gas spring 240 includes a button 272 for moving the mast gas spring 240 from a locked state to an unlocked state. The mast gas spring 240 is movable toward the extended position in the unlocked state and is prevented from being moved toward the extended position in the locked state. However, the mast gas spring 240 can move toward the retracted state in both the locked state and the unlocked state. The mast gas spring 240 is configured to default to the locked state.

The mounting portion 220 of the mast clamp 210 is slidably and rotatably coupled to the housing 110 of the clamping storage device. This allows for the mast clamp 210 to be adjusted to suit masts at different locations and orientations. The mounting portion 220 includes a bolt 222 extending through a slot 224 in the clamping storage device housing 110 and through an opening in the mounting portion 220 of the mast clamp 210. A threaded knob 226 is threaded onto the end of the bolt 222 to secure the mast clamp 210 to the housing 110. The threaded knob 226 can be loosened to allow the mast clamp 210 to be adjusted and tightened to prevent further unwanted movement.

In use, the distal mast stop 260 can be urged toward the retracted position such that the contact surfaces 264, 254 of the distal mast stop 260 and the proximal mast stop 250 each contact sides of a mast. Further pressure can cause the distal ends of the resilient V-shaped portions 262, 252 of the distal mast stop 260 and the proximal mast stop 250 to be deflected away from each other. This deflection helps to account for any backlash in the gas spring 240 that may occur before the locking mechanism in the locked state prevents further travel of the distal mast stop 260 toward the extended position.

To release the mast, the button 272 of the locking mechanism can be pressed to move the mast gas spring 240 from the locked state to the unlocked state. In the unlocked state, the mast gas spring 240 moves under a biased force toward the extended position such that the distal mast portion 260 no longer abuts the mast. The mast can then be removed from the mast clamp 210.

A number of example implementations are provided herein. However, it is understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device are disclosed herein, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A clamping storage device, the device comprising:
   a clamping assembly comprising:
   a proximal stop extending along a proximal stop longitudinal axis;
   a gas spring having a gas spring longitudinal axis, a first end, and a second end opposite and spaced apart from the first end along the gas spring longitudinal axis, wherein the first end of the gas spring is coupled to the proximal stop; and
   a distal stop coupled to the second end of the gas spring, wherein the distal stop extends along a distal stop longitudinal axis,
   wherein the proximal stop longitudinal axis and the distal stop longitudinal axis are both locatable in an assembly plane that incudes the gas spring longitudinal axis,
   wherein the gas spring is movable parallel to the gas spring longitudinal axis between a retracted position and an extended position, wherein the distal stop is further from the proximal stop in the extended position than it is in the retracted position, wherein the gas spring is biased toward the extended position and urgable toward the retracted state, and
   wherein the gas spring is movable between a locked state and an unlocked state, wherein the gas spring is movable toward the extended position in the unlocked state and is prevented from being moved toward the extended position in the locked state.

2. The device of claim 1, further comprising a housing, wherein the housing includes the proximal stop.

3. The device of claim 2, wherein the housing defines a cavity, wherein the first end of the gas spring is disposed within the cavity.

4. The device of claim 1, further comprising a handle for moving the gas spring between the extended position and the retracted position.

5. The device of claim 1, wherein the clamping assembly is a first clamping assembly, the device further comprising a second clamping assembly, wherein a plane including the gas spring longitudinal axis of the first clamping assembly and the gas spring longitudinal axis of the second clamping assembly is perpendicular to the assembly plane of the first clamping assembly and the assembly plane of the second clamping assembly.

6. The device of claim 1, wherein the clamping assembly is a first clamping assembly, the device further comprising a second clamping assembly, wherein the assembly plane of the first clamping assembly is the same as the assembly plane of the second clamping assembly.

7. The device of claim 6, wherein the gas spring longitudinal axis of the first clamping assembly and the gas spring longitudinal axis of the second clamping assembly form an oblique angle, wherein the first end of the gas springs are closer to each other than the second ends of the gas springs.

8. The device of claim 6, further comprising a housing, wherein the housing includes the proximal stop of the first clamping assembly and the proximal stop of the second clamping assembly.

9. The device of claim 8, wherein the housing defines a cavity, wherein the first end of the gas spring of the first clamping assembly and the first end of the gas spring of the second clamping assembly are disposed within the cavity.

10. The device of claim 6, further comprising a third clamping assembly and a fourth clamping assembly, wherein the assembly plane of the third clamping assembly is the same as the assembly plane of the fourth clamping assembly.

11. The device of claim 10, wherein the gas spring longitudinal axis of the third clamping assembly and the gas spring longitudinal axis of the fourth clamping assembly form an oblique angle, wherein the first end of the gas springs are closer to each other than the second ends of the gas springs.

12. The device of claim 10, wherein a plane including the gas spring longitudinal axis of the first clamping assembly and the gas spring longitudinal axis of the third clamping assembly is perpendicular to the assembly plane of the first clamping assembly and the assembly plane of the third clamping assembly.

13. The device of claim 12, wherein a plane including the gas spring longitudinal axis of the second clamping assembly and the gas spring longitudinal axis of the fourth clamping assembly is perpendicular to the assembly plane of the second clamping assembly and the assembly plane of the fourth clamping assembly.

14. The device of claim 1, further comprising a locking trigger for moving the gas spring from the locked state to the unlocked state.

15. The device of claim 14, wherein the locking trigger is disposed at a position that is at an opposite side of the proximal stop from the distal stop.

16. The device of claim 1, wherein the proximal stop longitudinal axis and the gas spring longitudinal axis form an oblique angle such that the distal stop is closer to a distal end of the proximal stop than it is to a proximal end of the proximal stop.

17. The device of claim 1, wherein the distal stop longitudinal axis and the gas spring longitudinal axis form an oblique angle such that the proximal stop is closer to a distal end of the distal stop than it is to a proximal end of the distal stop.

18. The device of claim 17, wherein the distal end of the distal stop is resiliently movable away from the proximal stop by a biasing force of the gas spring.

19. The device of claim 1, further comprising a mounting portion for mounting the device to a vehicle, wherein the mounting portion is adjacent the proximal stop.

20. The device of claim 1, further comprising a mast clamp configured to releasably secure a mast of a sports board being secured by the proximal stop and the distal stop, wherein the mast clamp includes a proximal mast stop and a distal mast stop, wherein the distal mast stop is movable relative to the proximal mast stop parallel to a mast longitudinal axis between a retracted position and an extended position, wherein the distal mast stop is further from the proximal mast stop in the extended position than it is in the retracted position.

21. The device of claim 20, wherein the mast longitudinal axis is disposed perpendicular to the gas spring longitudinal axis.

22. The device of claim 20, wherein the mast clamp further includes a mast gas spring having a first end and a second end opposite and spaced apart from the first end of the mast gas spring along the mast longitudinal axis, wherein the mast gas spring is movable parallel to the mast longitudinal axis to move the distal mast stop between the retracted position and the extended position.

23. The device of claim 22, wherein the mast gas spring is movable between a locked state and an unlocked state, wherein the mast gas spring is movable toward the extended position in the unlocked state and is prevented from being moved toward the extended position in the locked state.

* * * * *